United States Patent [19]

Blum et al.

[11] Patent Number: 5,750,613
[45] Date of Patent: May 12, 1998

[54] AQUEOUS, CROSSLINKABLE BINDER DISPERSIONS HAVING A LOW SOLVENT CONTENT

[75] Inventors: Harald Blum, Wachtendonk; Armin Sickert; Wieland Hovestadt, both of Krefeld, all of Germany

[73] Assignee: Bayer Aktiengesellschaft, Leverkusen, Germany

[21] Appl. No.: 685,424

[22] Filed: Jul. 30, 1996

[30] Foreign Application Priority Data

Aug. 7, 1995 [DE] Germany ............ 195 28 939.0

[51] Int. Cl.$^6$ .................................... C08J 3/02
[52] U.S. Cl. ............ 524/457; 524/376; 524/461; 524/507; 524/510; 524/512; 524/522; 524/533
[58] Field of Search ............... 524/376, 457, 524/507, 510, 512, 522, 461, 533

[56] References Cited

U.S. PATENT DOCUMENTS

| | | | |
|---|---|---|---|
| 5,430 | 7/1848 | Harris et al. | 524/315 |
| 3,674,734 | 7/1972 | Parker | 260/31.2 N |
| 3,862,063 | 1/1975 | Pettit, Jr. | 260/15 |
| 4,137,205 | 1/1979 | Berenschot et al. | 260/29.4 U |
| 4,312,800 | 1/1982 | Jasenof et al. | 260/29.6 E |
| 4,322,328 | 3/1982 | Graetz et al. | 524/458 |
| 4,423,165 | 12/1983 | Harper et al. | 523/409 |
| 4,525,543 | 6/1985 | Sekmakas et al. | 525/529 |
| 4,745,153 | 5/1988 | Hoffman | 524/762 |
| 4,857,580 | 8/1989 | Patzschke et al. | 524/507 |
| 4,865,705 | 9/1989 | Hendrikx et al. | 204/181.7 |
| 4,916,181 | 4/1990 | Maska et al. | 524/457 |
| 4,950,709 | 8/1990 | Schlueter et al. | 524/762 |
| 5,019,621 | 5/1991 | Rauch-Puntigam et al. | 524/513 |
| 5,075,370 | 12/1991 | Kubitza et al. | 524/591 |
| 5,157,069 | 10/1992 | Campbell | 524/507 |
| 5,262,464 | 11/1993 | Koevenig et al. | 524/413 |
| 5,281,655 | 1/1994 | Mitsuji et al. | 524/507 |
| 5,308,912 | 5/1994 | Margotte et al. | 524/507 |
| 5,322,865 | 6/1994 | Inoue et al. | 524/457 X |
| 5,331,039 | 7/1994 | Blum et al. | 524/507 |
| 5,401,553 | 3/1995 | Miwa et al. | 524/507 X |
| 5,468,804 | 11/1995 | Schmalstieg et al. | 524/591 |

FOREIGN PATENT DOCUMENTS

| | | |
|---|---|---|
| 2088217 | 7/1993 | Canada . |
| 133949 | 3/1985 | European Pat. Off. . |
| 288763 | 11/1988 | European Pat. Off. . |
| 3209421 | 9/1983 | Germany . |
| 2120261 | 11/1983 | United Kingdom . |

OTHER PUBLICATIONS

Paint & Resin Dec. 1983, p. 34 et seq.

*Primary Examiner*—Judy M. Reddick
*Attorney, Agent, or Firm*—Joseph C. Gil; Thomas W. Roy

[57] ABSTRACT

This invention relates to aqueous, crosslinkable binder dispersions which have a low solvent content and contain hydroxy-functional polyethers, hydroxy-functional acrylate copolymers and hydroxy- and carboxy-functional acrylate copolymers, to a process for the production of these binders, to one and two-component binder compositions containing these binders and to the use of the binder compositions in coating compositions.

14 Claims, No Drawings

AQUEOUS, CROSSLINKABLE BINDER DISPERSIONS HAVING A LOW SOLVENT CONTENT

BACKGROUND OF THE INVENTION

1. Field of the Invention

The present invention relates to aqueous, crosslinkable binder dispersions having a low solvent content and based on hydroxy-functional polyethers and hydroxy-functional acrylate copolymers, to a process for the production of these binders, to binder compositions containing these binders and to the use of these binder dispersions in coating compositions.

2. Description of the Prior Art

It is known to use copolymer-based, water-borne binders in coating systems as described, e.g., in Paint & Resin 12/83, pages 34 et seq., DE-A 3,209,421, EP-A 95,263, EP-A 105,293, EP-A 133,949, EP-A 288,763, DE-A 4,202,212 and the literature cited therein. These binders contain emulsifiers to stabilize them or contain relatively large proportions of organic co-solvents. The emulsifiers generally have a negative effect on the properties of the lacquers or coatings, such as water resistance, optical properties of the film (gloss) and pigmentability.

The use of relatively large quantities of organic solvents in the production of aqueous secondary copolymer dispersions is determined by the production process because they ensure controlled heat exchange, a stirrable viscosity and minimum reactor loading during production of the initially organically-dissolved polymers and are generally advantageous for lacquer properties, such as storage stability, pigment wetting, film optical properties and levelling.

However, it is not possible for environmental reasons to use relatively large quantities of solvents in binders or coating compositions. Removal of the solvent content arising from production is costly.

Another disadvantage of secondary dispersions is the very high amount of carboxylate groups necessary to form a stable dispersion and the correspondingly large quantities of neutralizing agents which cause problems during curing, for example, by remaining in the coating and causing disruptive hydrophilicity.

Copolymer dispersions, which are to be cured by a chemical reaction, for example, with an amino resin, a blocked polyisocyanate or a polyisocyanate, must contain a certain quantity of reactive groups such as hydroxyl groups.

These groups are generally introduced into the copolymer by also using hydroxy-functional (meth)acrylic acid esters during copolymerization. However, these raw materials are very expensive in comparison with non-functional (meth)acrylic acid esters or styrene, and relatively large quantities of these raw materials must frequently be used in comparison with organically dissolved copolymers, to offset the hydrophilicity of the coatings by means of a greater crosslinking density.

Secondary dispersions have a low solids content which is determined, inter alia, by an elevated concentration of salt groups in the polymer. This results in elevated production and transport costs and prevents the production of high-solids lacquers.

These disadvantages are avoided by easy to produce copolymer dispersions which contain only small quantities of volatile organic substances. These dispersions, in combination with crosslinking resins, allow for the production of high quality coatings with good solvent resistance and good optical properties. These dispersions yield storage-stable, high-solids dispersions and lacquers with the smallest possible quantities of organic auxiliary solvents and neutralizing amine.

It has now surprisingly been found that the aqueous, crosslinkable binder dispersions according to the invention may fulfil the stated requirements. These dispersions have a low solvent content and are based on hydroxy-functional polyethers and hydroxy-functional acrylate copolymers.

SUMMARY OF THE INVENTION

The present invention relates to aqueous, crosslinkable binder dispersions A) having a low solvent content and containing, based on resin solids A1) 2 to 30 wt. % of at least one hydroxy-functional polyether having a functionality of 1.8 to 6.0, a viscosity at 25° C. of $\leq$ 4000 mPa $-$s, a molecular weight of 152 to 4000 and an OH number of 50 to 700 mg of KOH/g of solid, A2) 35 to 90 wt. % of a hydroxy-functional copolymer having an OH number of 20 to 220 mg KOH/g of solid and an acid number of 0 to 50 mg of KOH/g of solid and prepared from b1) (meth)acrylic acid esters and/or vinyl aromatics,
b2) hydroxy-functional monomers,
b3) optionally monomers other than b1), b2) and b4), and
b4) optionally acid-functional monomers and A3) 5 to 60 wt. % of a hydroxy- and carboxy-functional copolymer having an OH number of 30 to 220 mg of KOH/g of solid and an acid number of 25 to 200 mg of KOH/g of solid and prepared from b1) (meth)acrylic acid esters and/or vinyl aromatics,
b2) hydroxy-functional monomers,
b3) monomers other than b1), b2) and b4), and
b4) acid-functional monomers, wherein the sum of A1), A2) and A3) and the sum of b1), b2), b3) and b4) is in each case 100%, wherein the acid number is greater in A3) than in A2), wherein the acid number of dispersion A) is 8 to 45 mg of KOH/g of solid, the OH number is 25 to 200 mg of KOH/g of solid and the solids content is greater than 35 wt. %.

The present invention also relates to aqueous binder compositions prepared from 50 to 95 wt. % of aqueous binder dispersions A) and 5 to 50 wt. % of at least one crosslinking resin selected from amino resins, blocked polyisocyanates and polyisocyanates, in which the aqueous binder compositions have an organic solvent content of less than 5 wt.% and a solids contents of greater than 55 wt.%.

The present invention additionally relates to a process for the production of the dispersions A) according to the invention, by the free radically copolymerizing 35 to 90 wt. %, based on the resin solids of binder dispersion A), of b1) (meth)acrylic acid esters and/or vinyl aromatics,
b2) hydroxy-functional monomers,
b3) monomers other than b1), b2) and b4), and
b4) optionally acid-functional monomers, in the presence of 2 to 30 wt. %, based on the resin solids of binder dispersion A), of a hydroxy-functional polyether A1) having a functionality of 1.8 to 6.0, a viscosity at 25° C. of $\leq$4000 mPa $-$s, a molecular weight of 152 to 4000 and an OH number of 50 to 700 mg of KOH/g of solid, to yield a hydroxy-functional copolymer A2) having an OH number of 20 to 220 mg of KOH/g of solid and an acid number of 0 to 50 mg of KOH/g of solid and subsequently free radically copolymerizing 5 to 60 wt. %, based on the resin solids of binder dispersion A), of b1) (meth)acrylic acid esters and/or vinyl aromatics, b2) hydroxy-functional monomers, b3) monomers other than b1), b2) and b4), and b4) acid-functional monomers, to yield a hydroxy- and carboxy-functional copolymer A3) having an OH number of 30 to 220 mg of KOH/g of solid and an acid number of 25 to 200 mg of KOH/g of solid and subsequently converting 40 to 100% of the carboxyl groups into carboxylate groups by adding a neutralizing agent and dispersing the binder in water, wherein binder dispersion A) has a solids content of greater than 35 wt. % and an organic solvent content of less than 6% and wherein the sum of A1), A2) and A3) is 100%.

DETAILED DESCRIPTION OF THE INVENTION

Suitable polyethers A1) have a functionality of 1.8 to 6.0, preferably 2.0 to 4.0 and more preferably of 2.0 to 3.0; a viscosity (determined to DIN 53019 at 25° C.) of 4000 or less, preferably less than 2000 mPa.s; a number average molecular weight ($M_n$, which may be calculated from the hydroxyl functionality and hydroxyl group content) of 152 to 4000, preferably 200 to 3500 and more preferably 200 to 3100; and an OH number of 50 to 700, preferably 100 to 600 and more preferably 150 to 560 mg of KOH/g of solid.

Suitable polyethers include alkoxylation products of hydroxy-functional starter molecules, such as ethylene glycol, propylene glycol, trimethylolpropane, glycerol, sorbitol, pentaerythritol, butanediol, hexanediol and mixtures of these and other hydroxy-functional compounds.

Ethylene oxide and/or propylene oxide are particularly preferred as alkoxylating agents. Preferred starter molecules are propylene glycol, glycerol and trimethylolpropane. Mixtures of various polyethers A1) may also be used. While both hydrophilic and hydrophobic polyethers are suitable, it is preferred that the total hydrophilicity of the system should not exceed the quantity necessary in order to produce a stable dispersion.

Polyethers A1) are used in quantities of 2 to 30 wt. %, preferably 6.5 to 25 wt. % and more preferably 8 to 14 wt. %, based on the resin solids of dispersion A1).

Copolymers A2) are produced in the presence of A1) by the free radically initiated copolymerization of monomers b1) and b2), optionally in combination with monomers b3) and b4). The quantity of copolymer A2), based on resin solids of dispersion A), is 35 to 90, preferably 45 to 85 and more preferably 55 to 80 wt.%.

Suitable monomers b1) include (meth)acrylic acid esters and/or vinyl aromatics such as methyl methacrylate, butyl methacrylate, ethyl acrylate, butyl acrylate, 2-ethylhexyl acrylate, styrene, and α-methylstyrene.

Copolymer A2) contains monomers b1) in a quantity of 60 to 95, preferably 70 to 93 and more preferably 78 to 92 wt.%. Preferred monomers b1) are methyl methacrylate, butyl acrylate and styrene.

Suitable monomers b2) include hydroxy-functional monomers such as hydroxyethyl acrylate, hydroxyethyl methacrylate, hydroxypropyl acrylate, hydroxypropyl methacrylate and hydroxybutyl acrylate.

Copolymer A2) contains monomers b2) in quantities of 5 to 45, preferably 7 to 25 and more preferably 8 to 20 wt.%. Preferred monomers b2) are hydroxyethyl methacrylate, hydroxypropyl methacrylate and hydroxypropyl acrylate.

Suitable monomers b3) include acrylonitrile, methacrylonitrile, N-methylolmethacrylamide, N-methoxymethyl(meth)acrylamide, N-vinylpyrrolidone, vinyl triethoxysilane, divinylbenzene and hexanediol diacrylate.

Copolymer A2) contains monomers b3) in quantities of 0 to 20 wt. %, based on resin solids of component A2). Monomers b3) are preferably omitted.

Suitable monomers b4) include methacrylic acid, acrylic acid or maleic acid. Copolymer A2) contains monomers b4) in quantities of 0 to 6, preferably of 0 to 2 wt. % and more preferably 0%, based on resin solids of copolymer A2). Copolymers A2) are produced by the free radically initiated copolymerization of the monomer mixtures in the presence of polyether A1) and suitable organic solvents. The proportion of organic solvents is calculated such that the resulting coating composition containing binder dispersion A) contains at most 5% of organic solvents. This solvent content may be obtained by preparing copolymer A) at an at most 86, preferably at most 88% organic solution such that aqueous binder dispersion A) contains at most 6, preferably less than 5% of organic solvents.

Solvents which may be used for copolymerization are alcohols such as n-butanol, n-pentanol, n-hexanol, cyclohexanol, heptanol, ethylene glycol monomethyl ether, ethylene glycol monoethyl ether, ethylene glycol monobutyl ether, methoxypropanol, ethoxypropanol, butoxypropanol, diethylene glycol monomethyl ether, diethylene glycol monoethyl ether, diethylene glycol monobutyl ether, methyl glycolate, ethyl glycolate, butyl glycolate, methyl lactate, ethyl lactate, butyl lactate and mixtures of these and other alcohols together with ethers such as diethylene glycol dimethyl ether or dimethylpropylene glycol and other solvents such as N-methylpyrrolidone, solvent naphtha, ethyl carbonate, butyl acetate, xylene, toluene, cyclohexane, diacetone alcohol, methyl isobutyl ketone and acetone.

Suitable initiators include organic peroxides, such as dibenzoyl peroxide, di-tert.-butyl peroxide, tert.-butylperoxy-2-ethylhexanoate and dodecanoyl peroxide, and azo compounds, such as azobisisobutyronitrile, in quantities of 0.3 to 10, preferably of 0.6 to 3.0 wt. %, based on resin solids. Chain transfer agents, such as n-dodecylmercaptan or mercaptoethanol, may also be used in quantities of 0.1 to 1% in order to achieve the desired molecular weight. Copolymerization is generally carried out at a temperature of 100° to 180° C. using a monomer feed process.

Copolymers A3) are produced in the presence of polyethers A1), copolymers A2) and the previously described solvents by free radically initiated copolymerization of monomers b1) to b4). The quantity of copolymer A3), based on resin solids of dispersion A), is 5 to 60, preferably 7.5 to 45 and more preferably 10 to 32 wt.%.

Suitable monomers b1) to b4) are the same as those previously set forth. Monomers b1) are used in quantities of 45 to 90, preferably 50 to 85 and more preferably of 55 to 80 wt. %; monomers b2) are used in quantities of 5 to 50, preferably of 10 to 45 and more preferably of 15 to 35 wt. %; monomers b3) are used in quantities of 0 to 20 wt. % and preferably 0%; and monomers b4) are used in quantities of 2.5 to 30, preferably 4 to 25 and more preferably of 5 to 20 wt.%.

Suitable initiators and optional chain transfer agents are the same as those previously described. Copolymerization of copolymer A3) is generally performed at temperatures of 100° to 180° C. using a monomer feed process.

After copolymer A3) has been produced, the carboxyl groups contained in copolymer A3) and optionally in copolymer A2) are converted into carboxylate groups by adding a neutralizing agent and the binder obtained in this manner is dispersed in water. It is possible to either add the water to the binder or to add the binder to the water. It is also possible to simultaneously incorporate water and neutralizing agent into the binder or to disperse the binder in a water/neutralizing agent mixture. The dispersing step is conventionally performed for 1 to 2 hours at 40° to 90° C.

The quantity of hydroxy-functional monomers b2) are selected such that copolymer A2) has an OH number of 20 to 220, preferably of 30 to 120 and more preferably of 35 to 90 mg of KOH/g of resin solids; copolymer A3) has an OH number of 30 to 220, preferably of 40 to 160 and more preferably of 60 to 140 mg of KOH/g of resin solids; and dispersion A) has an OH number of 25 to 200, preferably of 45 to 160 and more preferably of 65 to 125 mg of KOH/g of resin solids.

The quantity of carboxy-functional monomers b4) are selected such that copolymer A2) has an acid number of 0 to 50, preferably of 0 to 25 and more preferably of 0 to 2 mg of KOH/g of resin solids; copolymer A3) has an acid number of 25 to 200, preferably of 40 to 160 and more preferably of 40 to 120 mg of KOH/g of resin solids, and such that the ratio of acid numbers of copolymers A3):A2) is greater than 1:1, preferably greater than 2:1, more preferably greater than 4:1.

In a particularly preferred embodiment, copolymer A2) contains no carboxy-functional monomers b4) and, thus, has an acid number of virtually 0 mg of KOH/g of solids. However, even in this case copolymer A2) may have a very low acid number of at most 2 mg of KOH/g of solids due to slight contamination or due to hydrolysis of the (meth) acrylic acid ester monomers.

The acid number of dispersion A) is 8 to 45, preferably 10 to 33, more preferably 12 to 22 mg of KOH/g of solids.

Organic amines and water-soluble, inorganic bases, for example sodium and potassium hydroxide or ammonia, may be used for neutralization. Preferred compounds are organic amines such as N-methylmorpholine, diethanolamine, triethanolamine, dimethyl-isopropanolamine, methyldiethanolamine, diethylethanolamine, dimethylethanolamine, butanolamine, dibutanolamine and morpholine, as well as ammonia and mixtures of these neutralizing agents, optionally in combination with other also higher molecular weight amines containing ether or ester groups. Once the aqueous copolymer dispersion has been neutralized, at least 40%, preferably 70 to 100%, of the neutralizable carboxyl groups have been neutralized by salt formation.

The pH value of aqueous dispersion A) is preferably 6.0 to 9.5. Depending upon the their degree of neutralization and molecular weight, the aqueous copolymers produced in this manner have solids contents of greater than 35, preferably greater than 38%.

Depending upon the added quantity of neutralizing agent, the type and quantity of organic solvents and the type and quantity of polyether A1), the dispersions A) are partially dissolved and partially dispersed. The proportion of dissolved constituents increases with a greater degree of neutralization, with increased co-solvent content and with increased quantities of hydrophilic polyethers A1). The dispersion ranges from a colloidal solution to a clear resin solution.

Dispersions A), which have an acid number of 12 to 22 mg of KOH/g of solids, are prepared by I) the free radically initiated copolymerization of
  b1) (meth)acrylic acid esters and/or vinyl aromatics, preferably in an amount of 60 to 95, more preferably 70 to 93 wt.%,
  b2) hydroxy-functional monomers, preferably in an amount of 5 to 45, more preferably 7 to 25 wt.%,
  b3) monomers other than b1), b2) and b4), preferably in an amount of 0 to 20, more preferably 0 to 10 wt. % and
  b4) acid-functional monomers, preferably in an amount of 0 to 6, more preferably 0 to 2 wt.%, in the presence of 2 to 30, preferably 6.5 to 25 and more preferably 8 to 14 wt. % of a hydroxy-functional polyether A1) having a functionality of 1.8 to 6.0, preferably 2.0 to 4.0 and more preferably of 2.0 to 3.0; a viscosity at 25° C. of ≦4000, preferably of ≦2000 mPa −s; a number average molecular weight of 152 to 4000, preferably of 200 to 3500 and more preferably of 200 to 3100; an OH number of 50 to 700, preferably of 100 to 600 and more preferably of 150 to 560 mg of KOH/g of solid, and optionally in the presence of suitable solvents to form a copolymer A2) having an OH number of 20 to 220, preferably of 30 to 120 and more preferably of 35 to 90 mg of KOH/g of solids and an acid number of 0 to 50, preferably 0 to 25 and more preferably 0 to 2 mg of KOH/g of solids, and such that copolymer A2) constitutes 35 to 90, preferably 45 to 85 and more preferably 55 to 80 wt. % of the total quantity of resin solids in dispersion A), II) subsequently free radically copolymerizing
  monomers b1), preferably in an amount of 45 to 90, more preferably 50 to 85 wt.%,
  monomers b2), preferably in an amount of 5 to 50, more preferably 10 to 45 wt.%,
  monomers b3), preferably in an amount of 0 to 20, more preferably 0 to 10wt. %, and
  monomers b4), preferably in an amount of 2.5 to 30, more preferably 4 to 25 wt.%, in the presence of copolymer A1) and copolymer A2) to form copolymer A3) having an OH number of 30 to 220, preferably of 45 to 160 and more preferably of 65 to 125 mg of KOH/g of solids and an acid number of 25 to 200, preferably 30 to 150 and more preferably 40 to 120 mg of KOH/g of solids, provided that the acid number in copolymer A3) is greater than the acid number of copolymer A2), and such that copolymer A3) constitutes 5 to 60, preferably 7.5 to 45 and more preferably 10 to 32 wt. % of the total quantity of resin solids in dispersion A), and III) and subsequently neutralizing 40 to 100% of the carboxyl groups to form carboxylate groups and dispersing the copolymers in water to yield a dispersion A) having a solids content of greater than 35 wt. % and an organic solvent content of less than 6 wt.%. The sum of the solids contents of copolymers A1), A2) and A3) is 100%.

Binder dispersions A) are preferably used in combination with crosslinking resins and optionally pigments and other known lacquer additives in a lacquer or coating composition. The ready-to-use coating compositions preferably contain 55 to 97, more preferably 65 to 90 wt.% of dispersion A) and 3 to 45, preferably 10 to 35 wt. % of crosslinking agent, based on the solids content of the copolymers and crosslinking agents.

Suitable crosslinking resins include amide/formaldehyde resins, amine/formaldehyde resins, phenolic resins, aldehyde and ketone resins such as phenol/formaldehyde resins, resols, furan resins, urea resins, carbamic acid ester resins, triazine resins, melamine resins, benzoguanamine resins, cyanamide resins and aniline resins, which are described in *Lackkunstharze*, H. Wagner, H. F. Sarx, Carl Hanser Verlag Munich, 1971.

Blocked polyisocyanates are also very suitable as crosslinking resins, for example, those based on isophorone diisocyanate, hexamethylene diisocyanate, 1,4-diisocyanatocyclohexane, bis-(4-isocyanatocyclohexyl)methane, 1,3-diisocyanatobenzene, 1,4-diisocyanatobenzene, 2,4-diisocyanato-1-methylbenzene, 1,3-diisocyanato-2-methylbenzene, 1,3-bis-isocyanatomethylbenzene, 2,4-bisisocyanato-methyl-1,5-dimethylbenzene, bis-(4-isocyanatophenyl)propane, tris-(4-isocyanatophenyl)-methane, trimethyl-1,6-diisocyanatohexane. The blocked polyisocyanates may also be based on lacquer polyisocyanates containing biuret groups and prepared from 1,6-diisocyanatohexane, or lacquer polyisocyanates containing urethane groups and prepared from 2,4- and/or 2,6-diisocyanatotoluene or isophorone diisocyanate and low molecular weight polyhydroxyl compounds such as trimethylolpropane, the isomeric propanediols or butanediols or mixtures of these polyhydroxyl compounds.

Suitable blocking agents for these polyisocyanates include monohydric alcohols such as methanol, ethanol, butanol, hexanol, cyclohexanol and benzyl alcohol; oximes such as acetoxime or methyl ethyl ketoxime; lactams such as α-caprolactam; and phenols.

The hydrophilic modification of the binder dispersion A) is generally sufficient in order to provide dispersibility to the crosslinking resins, when they are not already water-soluble or water-dispersible.

Water-soluble or water-dispersible blocked polyisocyanates may be obtained by modification, e.g. with carboxylate and/or polyethylene oxide groups.

Low viscosity, hydrophobic or hydrophilic polyisocyanates having free isocyanate groups and prepared from aliphatic, cycloaliphatic, araliphatic and/or aromatic isocyanates are also suitable crosslinking resins. At 23° C. these polyisocyanates generally have a viscosity of 50 to 5000 mPa –s. If necessary, the polyisocyanates may be used as blends with small quantities of inert solvents to reduce their viscosity to a value within the stated range.

It is possible to hydrophilically modify these polyisocyanates, for example, by reacting them with less than stoichiometric quantities of monohydric, hydrophilic polyether alcohols. The production of such hydrophilic polyisocyanates is described, for example, in EP-A 540,985.

Mixtures of crosslinking resins may also be used.

Before, during or after production of the aqueous binder compositions by blending the individual components and also when producing coating compositions which are to be applied as a single component, it is possible to add conventional lacquer additives such as defoamers, thickeners, levelling agents, pigments, dispersing aids, catalysts, anti-skinning agents, anti-settling agents, driers and emulsifiers.

The coating compositions according to the invention are suitable for any applications in which solvent-based, solvent-free or other types of aqueous paint and coating systems having a broad range of properties are used. Examples include surface coating mineral construction materials; coating and sealing wood and derived timber products; coating metallic surfaces; coating road surfaces containing asphalt or bitumen, and coating and sealing various plastic surfaces.

The lacquers or coating compositions produced according to the invention may be used as primers, surfacers, and pigmented or transparent topcoats in industrial coating applications and for automotive OEM and refinish applications.

Dispersions A) are preferably used in combination with amino crosslinking resins or blocked polyisocyanates for coating metallic surfaces with pigmented coatings having a solids content of greater than 55 wt. %, preferably of greater than 60 wt. %, and an organic solvent content of less than 5 wt.%.

The coating compositions may be applied by various spraying methods such as pneumatic, airless or electrostatic spraying using one-component or optionally two-component spraying equipment. The coating compositions may also be applied by other methods, for example, by brush, roller or knife coating.

EXAMPLES

Unless otherwise stated, all percentages are by weight; all examples were performed under inert gas (nitrogen); and all OH and acid numbers were given in mg of KOH/g of resin solids. Viscosities were determined at 23° C. in a Contraves rotational viscosimeter according to DIN 53019-T01-80. The representative rate gradient D was $9.245^{-1}$.

Example 1

116 g of ethylene glycol monobutyl ether and 150 g of a polyether A1) (i.e., propoxylated glycerol having an OH number of 245, a viscosity at 25° C., of 250 mPa –s, a molecular weight of 690 and a functionality of 3) were weighed into a 4 liter reaction vessel equipped with stirring, cooling and heating devices and heated to 155° C. A mixture of 321 g of butyl acrylate, 366 g of styrene and 198 g of hydroxyethyl methacrylate was then added over a period of 2 hours, while simultaneously adding 17.1 g of di-tert.-butyl peroxide dissolved in 28.6 g of ethylene glycol monobutyl ether to form copolymer A2). Immediately thereafter, a mixture of 180 g of butyl acrylate, 139 g of styrene, 83 g of hydroxyethyl methacrylate and 34 g of acrylic acid was added over a period of 1 hour, while simultaneously adding 12.9 g of di-tert.-butyl peroxide dissolved in 21.4 g of ethylene glycol monobutyl ether over a period of 1.5 hours to form copolymer A3). After stirring for a further 2 hours at 150° to 155° C., the temperature was reduced to 100° C., 50 g of dimethyl ethanolamine were added and the mixture dispersed in 1980 g of distilled water. The resulting aqueous binder dispersion A) had a solids content of 40%, an organic solvent content of 4.4%, an acid number of 19 and an OH number of 105.

Example 2

228 g of ethylene glycol monobutyl ether and 250 g of a polyether A1) (i.e., ethoxylated trimethylolpropane having an OH number of 550, a viscosity at 25° C. of 500 mPa –s, a molecular weight of 306 and a functionality of 3) were weighed into a 6 liter reaction vessel equipped with stirring, cooling and heating devices and heated to 155° C. A mixture of 625 g of butyl acrylate, 700 g of styrene and 150 g of hydroxyethyl methacrylate was added over a period of 2.5 hours, while simultaneously adding 27.8 g of ethylene glycol monobutyl ether to form copolymer A2). Immediately thereafter, a mixture of 300 g of butyl acrylate, 231 g of styrene, 138 g of hydroxyethyl methacrylate and 56 g of acrylic acid was added over a period of 1.5 hours, while simultaneously adding 22.2 g of di-tert.-butyl peroxide dissolved in 22.2 g of ethylene glycol monobutyl ether over a period of 2 hours to form copolymer A3). After stirring for a further 2 hours at 150° to 155° C., the temperature was reduced to 100° C., 83 g of dimethylethanolamine were added and the mixture was dispersed in 3080 g of distilled water. The resulting aqueous binder dispersion A) had a solids content of 41.5%, an organic solvent content of 4.6%, an acid number of 18 and an OH number of 105.

Example 3

70 g of ethylene glycol monobutyl ether, 70 g of diethylene glycol monoethyl ether and 150 g of the polyether A1) described in example 2 were weighed into a 4 liter reaction vessel equipped with stirring, cooling and heating devices and heated to 155° C. A mixture of 360 g of butyl acrylate, 420 g of methyl methacrylate and 75 g of hydroxyethyl acrylate was then added over a period of 2 hours, while simultaneously adding 25.7 g of di-tert.-butyl peroxide dissolved in 8 g of ethylene glycol monobutyl ether and 8 g of diethylene glycol monoethyl ether to form copolymer A2). Immediately thereafter, a mixture of 139 g of butyl acrylate, 195 g of methyl methacrylate, 82 g of hydroxyethyl acrylate and 34 g of acrylic acid was added over a period of 1 hour, while simultaneously adding 19.3 g of di-tert.-butyl peroxide dissolved in 5.5 g of ethylene glycol monobutyl ether and 5.5 g of diethylene glycol monoethyl ether over a period of 1.5 hours to form copolymer A3). After stirring for a further 2 hours at 150° to 155° C., the temperature was reduced to 100° C., 52.5 g of dimethylethanolamine were added and the mixture dispersed in 1670 g of distilled water. The resulting aqueous binder dispersion A) had a solids content of 44%, an organic solvent content of 4.8%, an acid number of 21 and an OH number of 106.

Example 4

120 g of ethylene glycol monobutyl ether, 120 g of diethylene glycol monoethyl ether, 180 g of the polyether A1) described in example 2 and 100 g of another polyether A1) (i.e., propoxylated trimethylol-propane having an OH number of 56, a viscosity at 25° C. of 500 mPa −s, a molecular weight of 3005 and a functionality of 3) were weighed into a 6 liter reaction vessel equipped with stirring, cooling and heating devices and heated to 155° C. A mixture of 600 g of butyl acrylate, 125 g of hydroxyethyl acrylate and 700 g of methyl methacrylate was then added over a period of 2 hours, while simultaneously adding 42.8 g of di-tert.-butyl peroxide dissolved in 11 g of ethylene glycol monobutyl ether and 11 g of diethylene glycol monoethyl ether to form copolymer A2). Immediately thereafter, a mixture of 256 g of butyl acrylate, 275 g of methyl methacrylate, 162 g of hydroxyethyl acrylate and 56 g of acrylic acid was added over a period of 1 hour, while simultaneously adding 32.2 g of di-tert.-butyl peroxide dissolved in 7 g of ethylene glycol monobutyl ether and 7 g of diethylene glycol monoethyl ether over a period of 1.5 hours to form copolymer A3). After stirring for a further 2 hours at 150° to 155° C., the temperature was reduced to 100° C. and 84 g of dimethylethanolamine and 2700 g of distilled water were added. The resulting aqueous binder dispersion A) had a solids content of 44.5%, an organic solvent content of 4.9%, an acid number of 22 and an OH number of 97.

Example 5

116 g of ethylene glycol monobutyl ether and 150 g of a polyether A1) (i.e., propoxylated propylene glycol having an OH number of 515, a viscosity at 25° C. of 55 mPa −s, a molecular weight of 218 and a functionality of 2) were weighed into a 4 liter reaction vessel equipped with stirring, cooling and heating devices and heated to 155° C. A mixture of 360 g of butyl acrylate, 410 g of styrene and 160 g of hydroxyethyl methacrylate was then added over a period of 2 hours, while simultaneously adding 17.2 g of di-tert.-butyl peroxide dissolved in 28 g of ethylene glycol monobutyl ether to form copolymer A2). Immediately thereafter, a mixture of 180 g of butyl acrylate, 34 g of acrylic acid, 82 g of hydroxyethyl methacrylate and 85 g of styrene was added over a period of 1 hour, while simultaneously adding 12.8 g of di-tert.-butyl peroxide dissolved in 22 g of ethylene glycol monobutyl ether over a period of 1.5 hours to form copolymer A3). After stirring for a further 2 hours at 150° to 155° C., the temperature was reduced to 100° C., 57 g of dimethylisopropanolamine were added and the mixture was dispersed in 1700 g of distilled water. The resulting aqueous binder dispersion A) had a solids content of 41%, an organic solvent content of 4.5%, an acid number of 20 and an OH number of 120.

Comparative Example 6

This example essentially corresponds to example 3 with the exception that polyether A1) was not used. 140 g of ethylene glycol monobutyl ether and 140 g of diethylene glycol monoethyl ether (twice the quantity of solvent used in example 3 for the purpose of achieving the minimum loading of reaction vessel) were weighed into a 4 liter reaction vessel equipped with stirring, cooling and heating devices and heated to 155° C. A mixture of 510 g of butyl acrylate, 420 g of methyl methacrylate and 75 g of hydroxyethyl acrylate was then added over a period of 2 hours, while simultaneously adding 25.7 g of di-tert.-butyl peroxide dissolved in 8 g of ethylene glycol monobutyl ether and 8 g of diethylene glycol monoethyl ether to form copolymer A2). Immediately thereafter, a mixture of 139 g of butyl acrylate, 195 g of methyl methacrylate, 82 g of hydroxyethyl acrylate and 34 g of acrylic acid was added over a period of 1 hour, while simultaneously adding 19.3 g of di-tert.-butyl peroxide dissolved in 5.5 g of ethylene glycol monobutyl ether and 5.5 g of diethylene glycol monoethyl ether over a period of 1.5 hours to form copolymer A3). After stirring for a further 2 hours at 150° to 155° C., the temperature was reduced to 100° C., 52.5 g of dimethylethanolamine were added and the mixture was dispersed in 1530 g of distilled water. The resulting aqueous binder dispersion had a solids content of 44%, an organic solvent content of 9.6%, an acid number of 21 and an OH number of 53.

The binders according to the invention from examples 1) to 5) and the binder from comparative example 6) were tested for storage stability at room temperature. The products according to the invention were stable in storage for more than 6 months, while the product from comparative example 6) exhibited phase separation after only 1 month and, thus, was not acceptable.

The binders according to the invention from examples 1), 2), 3), 4) and comparative example 6) were mixed in a solid to solid ratio of 80:20 with an amino-functional crosslinking resin (Cymel 327 from American Cyanamid) and ground with titanium dioxide resulting white-pigmented, stoving compositions for coatings. The coating compositions were applied to steel sheets and stoved for 10 minutes at 160° C. Application viscosity was 30 seconds in a DIN 4 cup at 23° C. Dry film thickness was approximately 30 to 40 μm. A white coating prepared from a commercially available, water-dilutable polyester binder (Bayhydrol D 155 from Bayer AG) was also tested as a further comparison example 7). The following results were obtained:

| Binder from example | 1 | 2 | 3 | 4 | 6 (comp) | 7 (comp) |
|---|---|---|---|---|---|---|
| Solids content of coating composition | 63% | 62% | 62% | 63% | 59% | 45% |
| Organic solvent content of coating composition | 3.4% | 3.5% | 3.4% | 3.5% | 6.4% | 10% |
| Pendulum hardness (DIN 53157) | 142 s | 150 s | 126 s | 138 s | 89 s | 145 s |
| Erichsen indentation to DIN 53156 | 5.9 | 5.4 | 4.7 | 4.8 | 4.8 | 6.5 |
| MEK double rub test[1] | -ve | -ve | -ve | -ve | -ve | -ve |
| Initial whiteness (Elrepho) | 87.6 | 88.0 | 87.7 | 87.9 | 87.2 | 86.4 |
| Whiteness after 1h, 180° C. | 85.9 | 85.5 | 84.4 | 85.0 | 81.7 | 79.1 |
| Gloss, 20° | 82 | 81 | 78 | 78 | 50 | 79 |
| Quantity of condensate[2] | 1.2% | 1.4% | 1.3% | 1.4% | 1.2% | 4.2% |

[1] Double rub test with a cotton wool swab saturated with methyl ethyl ketone. The film surface was assessed after 100 across and back strokes (-ve = no effect)

[2] The quantity of condensate was the quantity of volatile constituents in the coating composition that were released on heating to 160° C. for 15 minutes after the coating has been predried (1 hour at 125° C.). This was a measure of the loading of the stoving ovens with volatile constituents ("condensate"); the lower the value the better.

The stoving coating compositions containing the binders according to the invention have a very high solids content of above 60% at application viscosity. Both comparisons were below 60%. The mechanical properties of the cured coatings from examples 1 to 4 and comparison example 7 were comparatively good, while comparison 6 clearly deficient in film hardness.

The solvent resistance of all the films was good as determined by the MEK double rub test, i.e., 100 double rubs were made across the coating with a cloth saturated with methyl ethyl ketone. With regard to their whiteness retention on exposure to elevated temperature (overstoving resistance), the coatings from the examples according to the invention were distinctly better than the comparisons. With regard to gloss, the products according to the invention were comparably good as example 7, while comparison 6 was distinctly poorer.

With regard to condensate formation, the products according to the invention and comparison 6 were good, while comparison 7 was very poor. The comparison products contain distinctly more volatile organic solvents. In summary, it may be stated that the coating prepared in the examples according to the invention had good overall properties, while the coatings of the comparative examples exhibited considerable defects in some important properties. The good mechanical properties of the coatings according to the invention was surprising since poorer properties, e.g., embrittlement, were expected due to the sometimes very low molecular weights and elevated OH numbers of the polyether reactive diluents.

The good whiteness retention on exposure to elevated temperature and the small quantity of condensate were also surprising due to the presence of low molecular weight polyethers were present. Despite the small quantity of organic solvent and the low salt group content, the products according to the invention exhibited good pigment wetting, good optical properties and, above all, excellent storage stability at elevated solids contents.

An aqueous two-component polyurethane coating composition was produced from binder dispersion A) according to example 5) and a low viscosity polyisocyanate (i.e., a trimerization product of hexamethylene diisocyanate having a viscosity at 23° C. of 900 mPa−s and an average NCO content of 22.5%) by simple mixing with a glass rod (NCO:OH ratio=1.4:1) and cast onto glass sheets with a film spreader. Once cured at room temperature, a completely clear, crosslinked coating with very good mechanical properties was obtained. In contrast, when this example was repeated using the dispersion from comparative example 6), a turbid coating was obtained which was unsuitable for coating applications.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous, crosslinkable binder dispersion A) having a low solvent content and comprising, based on resin solids, A1) 6.5 to 25 wt. % of at least one hydroxy-functional polyether having a functionality of 1.8 to 6.0, a viscosity at 25° C. of ≦4000 mPa.s, a number average molecular weight of 152 to 4000 and an OH number of 50 to 700 mg of KOH/g of resin solids, A2) 35 to 90 wt. % of a hydroxy-functional copolymer having an OH number of 20 to 220 mg KOH/g of resin solids and an acid number of 0 to 50 mg of KOH/g of resin solids and A3) 5 to 60 wt. % of a hydroxy- and carboxy-functional copolymer having an OH number of 30 to 220 mg of KOH/g of resin solids and an acid number of 25 to 200 mg of KOH/g of resin solids wherein the sum of the percentages of A1), A2) and A3) is 100, wherein the acid number is greater in A3) than in A2) and wherein the acid number of dispersion A) is 8 to 45 mg of KOH/g of resin solids, the OH number is 25 to 200 mg of KOH/g of resin solids and the solids content is greater than 35 wt.%.

2. The aqueous binder dispersion A) of claim 1 wherein copolymer A2) is prepared from b1) 60 to 95 wt. % of (meth)acrylic acid esters and/or vinyl aromatics, b2) 5 to 45 wt. % of hydroxy-functional monomers, b3) 0 to 20 wt. % of monomers other than b1), b2) and b4), b4) 0 to 6 wt. % of acid-functional monomers and copolymer A3) is prepared from b1) 45 to 90 wt. % of (meth)acrylic acid esters and/or vinyl aromatics, b2) 5 to 50 wt. % of hydroxy-functional monomers, b3) 0 to 20 wt. % of monomers other than b1), b2) and b4), and b4) 2.5 to 30 wt. % of acid-functional monomers, wherein the sum of the percentages of b1), b2), b3) and b4) is 100 in each case.

3. The aqueous binder dispersion A) of claim 1) which comprises, based on resin solids, A1) 6.5 to 25 wt. % of at least one hydroxy-functional polyether having a functionality of 2.0 to 4.0, a viscosity at 25° C. of ≦2000 mPa·s and a number average molecular weight of 200 to 3500.

A2) 45 to 85 wt. % of a hydroxy-functional copolymer having an OH number of 30 to 120 mg KOH/g of resin solids and an acid number of 0 to 25 mg of KOH/g of resin solids and prepared from b1) 70 to 93 wt. % of (meth)acrylic acid esters and/or vinyl aromatics, b2) 7 to 25 wt. % of hydroxy-functional monomers and b4) 0 to 2 wt. % of acid-functional monomers and A3) 7.5 to 45 wt. % of a hydroxy- and carboxy-functional copolymer having an OH number of 40 to 160 mg of KOH/g of resin solids and an acid number of 30 to 150 mg of KOH/g of resin solids and prepared from b1) 50 to 85 wt. % of (meth)acrylic acid esters and/or vinyl aromatics, b2) 10 to 45 wt. % of hydroxy-functional monomers and b4) 4 to 25 wt. % of acid-functional monomers, wherein the sum of the percentages of A1), A2) and A3) and the sum of b1), b2) and b4) is 100 in each case, wherein the acid number of A3) is at least twice as high as A2), and wherein the acid number of dispersion A) is 10 to 33 mg of KOH/g of resin solids and the OH number is 45 to 160 mg of KOH/g of resin solids.

4. The aqueous binder dispersion A) of claim 1) which comprises, based on resin solids, A1) 8 to 14 wt. % of at least one hydroxy-functional polyether based on ethylene oxide and/or propylene oxide and having a functionality of 2.0 to 3.0, a viscosity at 25° C. of ≦2000 mPa·s, a number average molecular weight of 200 to 3500 and an OH number of 100 to 600 mg of KOH/g of resin solids, A2) 55 to 80 wt. % of a hydroxy-functional copolymer having an OH number of 35 to 90 mg KOH/g of resin solids and an acid number of 0 to 2 mg of KOH/g of resin solids and prepared from b1) 78 to 92 wt. % of (meth)acrylic acid esters and/or vinyl aromatics and b2) 8 to 20 wt. % of hydroxy-functional monomers and A3) 10 to 32 wt. % of a hydroxy- and carboxy-functional copolymer having an OH number of 60 to 140 mg of KOH/g of resin solids and an acid number of 40 to 120 mg of KOH/g of resin solids and prepared from b1) 55 to 80 wt. % of (meth)acrylic acid esters and/or vinyl aromatics, b2) 15 to 35 wt. % of hydroxy-functional monomers and b4) 5 to 20 wt. % of acid-functional monomers, wherein the sum of the percentages of A1), A2) and A3), b1) and b2) for copolymer A2) and b1), b2) and b4) for copolymer A3) is 100 in each case, wherein the acid number for copolymer A3) is at least four times as high as A2) and wherein the acid number of dispersion A) is 12 to 22 mg of KOH/g of resin solids.

5. The aqueous binder dispersion A) of claim 1) which comprises, based on resin solids, A1) 8 to 14 wt. % of at least one hydroxy-functional polyether prepared by the ethoxylation and/or propoxylation of propylene glycol, trimethylolpropane, diethylene glycol and/or glycerol and having a functionality of 2.0 to 3.0, a viscosity at 25° C. of ≦ 2000 mPa.s, a number average molecular weight of 200 to 3100 and an OH number of 150 to 560 mg of KOH/g of resin solids, A2) 55 to 80 wt. % of a hydroxy-functional copolymer having an OH number of 35 to 90 mg KOH/g of resin solids and an acid number of 0 to 2 mg of KOH/g of resin solids and prepared from b1) 78 to 92 wt. % of butyl acrylate, methyl methacrylate and/or styrene and b2) 8 to 20 wt. % of hydroxyethyl methacrylate or hydroxypropyl (meth)acrylate and A3) 10 to 32 wt. % of a hydroxy- and carboxy-functional copolymer having an OH number of 60 to 140 mg of KOH/g of resin solids and an acid number of 40 to 120 mg of KOH/g of resin solids and prepared from b1) 55 to 80 wt. % of butyl acrylate, methyl methacrylate and/or styrene, b2) 15 to 35 wt. % of hydroxyethyl (meth)acrylate or hydroxypropyl (meth)acrylate and b4) 5 to 20 wt. % of (meth)acrylic acid, wherein the sum of the percentages of A1), A2) and A3), b1) and b2) for copolymer A2) and b1), b2) and b4) for copolymer A3) is 100 in each case and wherein the solids content of dispersion A) is greater than 38%, the acid number is 12 to 22 mg of KOH/g of resin solids and the OH number is 65 to 120 mg of KOH/g of resin solids.

6. A one-component aqueous binder composition comprising 55 to 97 wt. % of the aqueous binder dispersion A) of claim 1 and 3 to 45 wt. % of at least one amino resin and/or blocked polyisocyanate crosslinking resin.

7. A two-component aqueous binder compositions comprising 55 to 97 wt. % of the aqueous binder dispersion A) of claim 1 and 3 to 45 wt. % of at least one polyisocyanate which contains free isocyanate groups and optionally hydrophilic groups.

8. A process for the production of the aqueous binder dispersion A) of claim 1 which comprises free radically copolymerizing 35 to 90 wt. %, based on the resin solids of binder dispersion A), of b1) (meth)acrylic acid esters and/or vinyl aromatics, b2) hydroxy-functional monomers, b3) monomers other than b1), b2) and b4), and b4) optionally acid-functional monomers, in the presence of 2 to 30 wt. %, based on the resin solids of binder dispersion A), of a hydroxy-functional polyether A1) having a functionality of 1.8 to 6.0, a viscosity at 25° C. of ≦4000 mPa.s, a number average molecular weight of 152 to 4000 and an OH number of 50 to 700 mg of KOH/g of solid, to yield a hydroxy-functional copolymer A2) having an OH number of 20 to 220 mg of KOH/g of solid and an acid number of 0 to 50 mg of KOH/g of solid and subsequently free radically copolymerizing 5 to 60 wt. %, based on the resin solids of binder dispersion A), of b1) (meth)acrylic acid esters and/or vinyl aromatics, b2) hydroxy-functional monomers, b3) monomers other than b1), b2) and b4), and b4) acid-functional monomers, to yield a hydroxy- and carboxy-functional copolymer A3) having an OH number of 30 to 220 mg of KOH/g of solid and an acid number of 25 to 200 mg of KOH/g of solid and subsequently converting 40 to 100% of the carboxyl groups into carboxylate groups by adding a neutralizing agent and dispersing the binder in water, wherein binder dispersion A) has a solids content of greater than 35 wt.% and an organic solvent content of less than 6% and wherein the sum of A1), A2) and A3) is 100%.

9. A pigmented stoving coating composition containing the aqueous binder composition of claim 7 and having a solvent content of less than 5 wt. % and a solids content of greater than 55 wt.%.

10. The aqueous binder dispersion A) of claim 1 wherein component A1) is present in an amount of 8 to 14 wt.%.

11. The process of claim 8 wherein component A1) is present in an amount of 6.5 to 25 wt. %, copolymer A2) is prepared from b1) 60 to 95 wt. % of (meth)acrylic acid esters and/or vinyl aromatics, b2) 5 to 45 wt. % of hydroxy-functional monomers, b3) 0 to 20 wt. % of monomers other than b1), b2) and b4), b4) 0 to 6 wt. % of acid-functional monomers and copolymer A3) is prepared from b1) 45 to 90 wt. % of (meth)acrylic acid esters and/or vinyl aromatics, b2) 5 to 50 wt. % of hydroxy-functional monomers, b3) 0 to 20 wt. % of monomers other than b1), b2) and b4), and b4) 2.5 to 30 wt. % of acid-functional monomers, wherein the sum of the percentages of b1), b2), b3) and b4) is 100 in each case.

12. The process of claim 8 wherein i) component A1 is present in an amount of 6.5 to 25 wt. %, based on resin solids, and comprises at least one hydroxy-functional polyether having a functionality of 2.0 to 4.0, a viscosity at 25° C. of ≦2000 mPa.s and a number average molecular weight of 200 to 3500, ii) component A2) is present in an amount of 45 to 85 wt. %, based on resin solids, and comprises a hydroxy-functional copolymer having an OH number of 30 to 120 mg KOH/g of resin solids and an acid number of 0 to 25 mg of KOH/g of resin solids and prepared from b1) 70 to 93 wt. % of (meth)acrylic acid esters and/or vinyl aromatics, b2) 7 to 25 wt. % of hydroxy-functional monomers and b4) 0 to 2 wt. % of acid-functional monomers and iii) component A3) is present in an amount of 7.5 to 45 wt. %, based on resin solids, and comprises a hydroxy- and carboxy-functional copolymer having an OH number of 40 to 160 mg of KOH/g of resin solids and an acid number of 30 to 150 mg of KOH/g of resin solids and prepared from b1) 50 to 85 wt. % of (meth)acrylic acid esters and/or vinyl aromatics, b2) 10 to 45 wt. % of hydroxy-functional monomers and b4) 4 to 25 wt. % of acid-functional monomers, wherein the sum of the percentages of A1), A2) and A3) and the sum of b1), b2) and b4) is 100 in each case, wherein the acid number of A3) is at least twice as high as A2), and wherein the acid number of dispersion A) is 10 to 33 mg of KOH/g of resin solids and the OH number is 45 to 160 mg of KOH/g of resin solids.

13. The process of claim 8 wherein i) component A1) is present in an amount of 8 to 14 wt. %, based on resin solids, and comprises at least one hydroxy-functional polyether based on ethylene oxide and/or propylene oxide and having a functionality of 2.0 to 3.0, a viscosity at 25° C. of ≦2000 mPa·s, a number average molecular weight of 200 to 3500 and an OH number of 100 to 600 mg of KOH/g of resin solids, ii) component A2) is present in an amount of 55 to 80 wt. %, based on resin solids, and comprises a hydroxy-functional copolymer having an OH number of 35 to 90 mg KOH/g of resin solids and an acid number of 0 to 2 mg of KOH/g of resin solids and prepared from b1) 78 to 92 wt. % of (meth)acrylic acid esters and/or vinyl aromatics and b2) 8 to 20 wt. % of hydroxy-functional monomers and iii) component A3) is present in an amount of 10 to 32 wt. %, based on resin solids, and comprises a hydroxy- and carboxy-functional copolymer having an OH number of 60 to 140 mg of KOH/g of resin solids and an acid number of 40 to 120 mg of KOH/g of resin solids and prepared from b1) 55 to 80 wt. % of (meth)acrylic acid esters and/or vinyl aromatics, b2) 15 to 35 wt. % of hydroxy-functional monomers and b4) 5 to 20 wt. % of acid-functional monomers, wherein the sum of the percentages of A1), A2) and A3), b1) and b2) for copolymer A2) and b1), b2) and b4) for copolymer A3) is 100 in each case, wherein the acid number for copolymer A3) is at least four times as high as A2) and wherein the acid number of dispersion A) is 12 to 22 mg of KOH/g of resin solids.

14. The process of claim 8 wherein i) component A1) is present in an amount of 8 to 14 wt. %, based on resin solids, and comprises at least one hydroxy-functional polyether prepared by the ethoxylation and/or propoxylation of propylene glycol, trimethylolpropane, diethylene glycol and/or glycerol and having a functionality of 2.0 to 3.0, a viscosity at 25° C. of ≦2000 mPa.s, a number average molecular weight of 200 to 3100 and an OH number of 150 to 560 mg of KOH/g of resin solids, ii) component A2) is present in an amount of 55 to 80 wt. %, based on resin solids, and comprises a hydroxy-functional copolymer having an OH number of 35 to 90 mg KOH/g of resin solids and an acid number of 0 to 2 mg of KOH/g of resin solids and prepared from b1) 78 to 92 wt. % of butyl acrylate, methyl methacrylate and/or styrene and b2) 8 to 20 wt. % of hydroxyethyl methacrylate or hydroxypropyl (meth)acrylate and iii) component A3) is present in an amount of 10 to 32 wt. %, based on resin solids, and comprises a hydroxy- and carboxy-functional copolymer having an OH number of 60 to 140 mg of KOH/g of resin solids and an acid number of 40 to 120 mg of KOH/g of resin solids and prepared from b1) 55 to 80 wt. % of butyl acrylate, methyl methacrylate and/or styrene, b2) 15 to 35 wt. % of hydroxyethyl (meth)acrylate or hydroxypropyl (meth)acrylate and b4) 5 to 20 wt. % of (meth)acrylic acid, wherein the sum of the percentages of A1), A2) and A3), b1) and b2) for copolymer A2) and b1), b2) and b4) for copolymer A3) is 100 in each case and wherein the solids content of dispersion A) is greater than 38%, the acid number is 12 to 22 mg of KOH/g of resin solids and the OH number is 65 to 120 mg of KOH/g of resin solids.

* * * * *